Patented July 12, 1938

2,123,190

UNITED STATES PATENT OFFICE 2,123,190

INSECTICIDE AND METHOD OF MAKING SAME

John F. Les Veaux, Middleport, N. Y., assignor to Niagara Sprayer and Chemical Co., Inc., Middleport, N. Y., a corporation No Drawing. Application April 3, 1935, Serial No. 14,529

13 Claims. (Cl. 167—15)

This invention relates to arsenical insecticides and more particularly to insecticides containing insoluble arsenates of substantially non-toxic metals such as calcium and magnesium.

The invention has among its principal objects the provision of an arsenical insecticide of the class specified which is substantially free from phytocidal substances, i. e. substances which are injurious to an objectionable degree to living plant organisms such as apple trees, peach trees and other trees or plants which are injured by these phytocidal substances when materials containing them are applied to these plants in the usual manner for controlling the insect pests thereon, as for instance in the manner and in accordance with the usual practice in applying lead arsenate to such plants.

It is well known that lead arsenate is substantially non-injurious to sensitive plants such as those mentioned above but the lead contained in this material is objectionable because of its toxic character which is cumulative in the human organism when the residues normally left on the fruits or other edible portions of the plant (except when washed by special methods) are taken into the human system as food. In recent years very low tolerances limiting the amount of lead upon fruits, vegetables, etc., have been promulgated by authorized government officials, both Federal and State, for this reason, so that it is highly desirable that an arsenical insecticide be provided which is substantially free from lead or other similar toxic metal and yet which is substantially as effective as lead arsenate for use as an insecticide on fruits and other edible portions of plants generally of the class which ordinarily require the use of arsenical insecticides in order to efficiently control certain insect pests to which they are normally subject.

Furthermore, it is well known that the lead in the lead arsenate residues normally remaining on the fruits, etc., is frequently difficult to remove even by the special washing methods referred to above so that it is equally desirable that an arsenical insecticide be provided, the normal residues of which can be more readily and conveniently removed from the fruits, etc., than is possible with lead arsenate.

I am aware that ordinary commercial calcium arsenate and magnesium arsenate have been proposed as substitutes for lead arsenate in order to avoid the toxic effects of lead and the lead residue problem referred to above, but these substitutes for lead arsenate have proved far from satisfactory mainly for the reason that they have been found to be injurious to the trees or plants to a very objectionable degree. I am also aware that various so-called safening agents have been proposed, to be added to the calcium arsenate or magnesium arsenate to render them less injurious to the trees or plants but these procedures likewise have not overcome the difficulties mentioned above to any satisfactory extent, if at all, or else the resulting materials have not possessed the necessary insecticidal value or toxicity toward the insect pests.

The present invention effectively meets the requirements outlined above and also completely or at least very largely overcomes the objections just mentioned in connection with prior attempts to meet these requirements, by providing an insecticide containing an arsenate of a non-toxic metal, preferably an arsenate of calcium, which is substantially free from phytocidal substances, is substantially non-injurious to trees, fruits and plants, is highly toxic toward insect pests and which possesses a resistance toward the decomposing action of carbon dioxide solution or carbonic acid substantially greater than that of the substantially insoluble reaction product obtained by bringing lime or other soluble calcium compounds into intimate contact with arsenic acid or a soluble arsenate and water at ordinary or elevated temperatures and separating the insoluble reaction product from the water.

In carrying out my invention I prefer to proceed as follows:

I first prepare a starting material consisting of so-called commercial calcium arsenate by adding approximately 75 percent arsenic acid to a suspension of hydrated lime in water containing about 12 percent hydrated lime, adjusting the relative proportions of arsenic acid and hydrated lime so as to produce a product containing not less than about 40 percent of arsenic expressed as $As_2O_5$ and consisting mainly of tribasic calcium arsenate, the formula of which is $Ca_3(AsO_4)_2$ and usually about 26 percent by weight of hydrated lime, all in accordance with procedures well known in this art.

The dried product thus obtained (so-called ordinary commercial calcium arsenate) is next screened, if necessary, to obtain a granular material, the particles of which range in size from about $\frac{1}{100}$ of an inch to about $\frac{1}{4}$ of an inch in diameter. This granular material is now heated uniformly to a temperature of about 1700 to 2000 degrees Fahrenheit for about one half hour to two hours, preferably for about an hour in a rotary type furnace such as is commonly used in decarbonating or calcining limestone to produce quick lime, using a non-reducing mixture of combustion gases from an oil or gas burner and air to supply the heat by direct transfer to the material to be heated. In heating the material the main consideration is that every particle be exposed to the hot gases in order to facilitate the flow of heat throughout the charge and to permit the heat to penetrate each particle, the object being to raise the temperature of substantially all of the particles in the mass to the temperature specified and to maintain this temperature for the specified period of time. The lining of the kiln is also provided with rows of fire brick projecting toward the axis of the kiln to promote the tumbling or stirring of the material during its passage through the furnace. The heat treated material produced in this way is next cooled in any convenient manner as by passing it through a second unheated rotating kiln or tube and then pulverized to any desired degree of fineness depending upon the use to which it is to be put, and is then ready for use in applying to plants as a dust, or, when suspended in water as a spray.

In operating the furnace it should be tilted at such an angle and rotated at such a speed as to allow about one half to two hours time for the passage of the material from the charging end of the furnace to the discharging end. Before introducing any material into the furnace the oil or gas torches are first lighted and the hot combustion gases therefrom mixed in any convenient manner with an incoming stream of air, the relative volumes of the combustion gases and the air being regulated so as to produce a mixture of gases containing an excess of oxygen and the temperature of the combustion gases being such as to raise the temperature of the mixed gases to about 2000 degrees Fahrenheit before they enter the furnace. If necessary the mixed gases may be cooled to this temperature by passing them through a cooling box or chamber before they enter the furnace proper. The hot gases are permitted to pass through the furnace until the furnace itself is slowly heated to such a temperature that the gases emerging from the lower end thereof acquire a temperature of about 1700 degrees Fahrenheit after which the temperature of the incoming gas mixture is regulated in any convenient manner so as to hold the temperature of the exit gases at the lower end of the furnace at about this same temperature, i. e., 1700 degrees Fahrenheit.

It is highly important to avoid a strongly reducing atmosphere of mixed hot gases in the furnace such as are commonly present in annealing furnaces, iron melting reverberatory furnaces, etc., although a neutral atmosphere is not harmful. To be safe and to allow for variations in firing, however, it is advisable to keep the flame strongly oxidizing by introducing air or other oxidizing gas. Also, since the gases from a neutral flame, or in other words, combustion gases which are neither reducing nor oxidizing ordinarily give a temperature which is too high for this purpose, the temperature of the mixed gases should preferably be regulated by regulating the supply of the excess air.

After the furnace and hot gases have reached equilibrium at the temperatures and under the conditions specified above and such that the exit gases are at a temperature of about 1700 degrees Fahrenheit, the granular calcium arsenate is fed into the upper end of the furnace continuously in such a manner that the material passes through the furnace at a reasonably constant rate.

As stated above, the hot heat-treated material is next cooled by passing it through a second rotary kiln or rotating cooling tube and as it is discharged from the latter it is conveyed on a continuous type conveyor to a grinding or pulverizing mill of any convenient type and there ground to the desired degree of fineness after which it is passed on to a second continuous conveyor and carried to a supply hopper from which it is drawn off directly into paper bags and packed therein for the market. In this manner the necessity for using air tight metal drums for packing the hot material is avoided.

Extensive field tests of the product produced in accordance with the foregoing specific example show that it is substantially free from phytocidal substances and yet at the same time possesses an insecticidal value or toxicity toward insect pests, which is substantially equal to that of acid lead arsenate under many conditions when applied to the plants to be treated at the rate of about one pound in place of each pound of lead arsenate ordinarily used in accordance with well-known practices. These field tests have also shown that the product of the above example is substantially as safe or non-injurious to the plants as the lead arsenate or at least approximates the safety of lead arsenate more nearly than any other insoluble arsenate heretofore produced.

It will be understood, however, that my invention is not restricted to the specific product and method set forth in the example of my invention described above but that numerous changes may be made in both the method and products as set forth in the appended claims. Thus, for instance, I may substitute magnesium arsenate as the starting material in place of the commercial calcium arsenate specified in the example with a resulting improvement in the safety of the magnesium arsenate when applied to plants. Likewise, I may substitute other forms of calcium arsenate as the starting material for the so-called commercial calcium arsenate which is ordinarily prepared in accordance with the method described above although I prefer the last mentioned product and method of making same for the reasons among others that I thus obtain a starting material of very uniform composition and a better finished final product and also avoid the interfering action of certain impurities commonly present in other forms of calcium arsenate resulting from other methods of manufacture, particularly when the so-called double decomposition method of making calcium arsenate is employed or when the calcium arsenate is produced by reacting upon lime with sodium arsenate. Some of the starting materials and methods of making same which may be substituted as a starting material for the commercial calcium arsenate and the method of making the same specified above are described in the following U. S. Patents: 1,447,938 (Ellis & Stewart); 1,507,690 (Simpson); 1,667,490 (Piver); 1,667,491 (Piver); 1,505,648 (Lamb); 1,626,942 (Lilpfert), and similar methods and products of the prior art.

Also my invention is not restricted to the use of granular commercial calcium arsenate of the particular size specified in the example, but I may use the raw material in a finely pulverized state with good results. When this is done the safening action resulting from the heat treatment takes place more rapidly than with granular material and for this reason the time during which the material is maintained at the specified temperature should be reduced accordingly, the treatment being discontinued when the calcium arsenate acquires the desired degree of safety or freedom from phytocidal impurities and before its toxicity to the insect pests becomes too low. The point at which this treatment should be discontinued may be determined by field tests of samples of the calcium arsenate or by testing its resistance toward the decomposing action of carbon dioxide solution or carbonic acid in accordance with a laboratory test or procedure to be described further on.

Likewise I may vary the temperature to which the material is heated since I have found that a substantial safening of the product begins to take place at temperatures as low as 1100 degrees Fahrenheit, although a longer time is required to produce such a safening effect at these lower temperatures than when the higher temperatures specified in the example are employed. At temperatures below about 1100 degrees Fahrenheit the safening action is not satisfactory even with prolonged heating. I may also use temperatures running up to about 2200 degrees Fahrenheit with good results under which conditions the safening action takes place more rapidly than it does under the conditions specified in the example and accordingly the time of treatment is shortened until the product acquires the desired properties of safety and toxicity as determined by field tests or by the carbonic acid test referred to above which will now be described in more detail. In determining the point at which the heating of the calcium arsenate should be discontinued in order to obtain a product having a satisfactory safety toward plants or at which it becomes substantially free from phytocidal substances and yet at the same time possesses the required degree of toxicity toward insect pests I test its resistance toward the decomposing action of carbon dioxide solution or carbonic acid and discontinue the heating when this resistance reaches a certain value or comes within a certain range of values as determined by the following carbonation test:—

Carbonated water is made by bubbling carbon dioxide through distilled water in a series of 5 or 6 flasks kept in a cold water bath for 24 hours or less. The flasks are emptied into one large bottle and agitated to make a uniform solution and the concentration of carbon dioxide is determined in the following manner:

Pipette 50 c. c. of approximately $N/10 Ba(OH)_2$ (made by dissolving 16 grams $Ba(OH)_2.8H_2O$ in one liter distilled water) into each of two beakers. Pipette 50 c. c. of the carbonated water into one of the beakers. Add three drops phenolpthalein to each beaker and titrate both beakers with standard $N/10 HCl$ to the point where the pink color of the solution disappears. The difference in the titrations is equivalent to the concentration of $CO_2$. The concentration is usually from .8 to 1.6 g. $CO_2$/liter.

The carbonation test itself is made as follows:

Five bottles of about 800 c. c. capacity are used. To the first is added 650 c. c. distilled water, to the second 550 c. c., to the third, 450 c. c., etc. To each bottle is then added 1.5 grams of the calcium arsenate in question. Then to number one is added 100 c. c. of the carbonated water, to number two is added 200 c. c. etc., giving a series containing 1.5 grams calcium arsenate in various concentrations of carbon dioxide.

The five bottles are tightly stoppered and put in a tumbling machine running about 50 R. P. M. and thus turned alternately bottoms up and down for 30 minutes to insure exposure of all particles of the sample to the carbonic acid. The temperature during this procedure is held at about 65 degrees Fahrenheit.

The solutions are then filtered and 500 c. c. of the filtrate treated with 3 c. c. of concentrated sulphuric acid and boiled down in a liter Erlenmeyer flask to about 100 c. c. volume, three grams of potassium iodide are added and the evaporation continued to 50 c. c. volume.

The cooled solution is made to 300 c. c. with distilled water, titrated to colorless point with $N/10$ sodium thio sulphate solution, neutralized with bicarbonate adding 5 grams in excess, a few drops of starch solution added and titrated with $N/20$ iodine.

It is observed that the above carbonation method is substantially the same as the method for determining water soluble arsenic in calcium arsenate described in the book entitled "Official and Tentative Methods of Analysis of the Association of Official Agricultural Chemists" second edition, published by the said association, pages 50 and 51. From the data obtained in this manner the amount of soluble arsenic in each bottle is calculated and expressed as metallic arsenic.

When ordinary commercial calcium arsenate, prepared by the first step described in the specific example of my invention given above, is tested in the manner just described, the results on the average are approximately as given in the following table:

Table I

| Grams $CO_2$/750 cc. | Percent soluble arsenic |
|---|---|
| 0.171 | 4.64 |
| 0.342 | 7.49 |
| 0.513 | 10.73 |
| 0.684 | 12.94 |
| 0.855 | 14.51 |

These results also approximate those obtained with calcium arsenate prepared in accordance with the prior art as described in the U. S. patents herein before mentioned.

In calculating the percent of soluble arsenic formed by the carbonic acid it will be understood that a correction must be made for the soluble arsenic already present in the untreated arsenate.

In the practice of my invention I prefer to continue the heating of the calcium arsenate, in the case where ordinary commercial calcium arsenate containing about 26 percent excess lime is employed as the starting material, until a representative sample of the product thus obtained, weighing about 1.5 grams, when brought into intimate contact with about ¼ gram of carbon dioxide dissolved in about 750 c. c. of water at a temperature of about 65 degrees Fahrenheit for about 30 minutes with stirring reacts with the carbon dioxide and water to form an amount of soluble arsenic, expressed as metallic arsenic, not more than about 2 percent of the weight of the sample.

When I calcine or heat-treat calcium arsenate containing more or less than about 26 percent excess lime, in accordance with the method of my invention, I prefer to continue the heating under any given set of conditions until a sample of the product thus produced, weighing about 1.5 grams, when brought into intimate contact with an amount of carbon dioxide dissolved in 750 c. c. of water which is substantially equivalent to the excess lime, at a temperature of about 65 degrees Fahrenheit, for about 30 minutes, with stirring, reacts with the carbon dioxide solution to form an amount of soluble arsenic, expressed as metallic arsenic, which is not more than 2 percent of the weight of the sample.

I have found that when the resistance of the heat-treated or calcined calcium arsenate toward the decomposing action of carbonic acid is such that the amount of soluble arsenic formed as determined by the above test (using about 2 grams of $CO_2$ per 750 c. c. of water) is less than about ½ percent, the resulting product does not possess a satisfactory toxicity toward insect pests such as those commonly controlled by means of lead arsenate or magnesium arsenate, etc.

It will be understood, however, that, in general, advantageous results are obtained if the heating or calcining of the calcium arsenate or magnesium arsenate or other similar insoluble arsenates of non-toxic divalent metals (whether containing excess lime or not) is continued until their safety toward plants is substantially increased provided the heating is discontinued before their toxicity toward insect pests is diminished to an undesirable extent, and it will be understood that this general procedure and method constitutes an important aspect or feature of my invention.

After the calcium arsenate is calcined or heated in accordance with my invention as described above I have found it advantageous to hydrate the calcined material, after cooling, and before it is packed in the containers for shipment, preferably by suspending the calcined calcium arsenate in water and boiling the water for about one hour or until any excess of quicklime or calcium oxide in the material is hydrated or converted to hydrated lime. It will be understood, however, that this rehydration step may be carried out in any convenient manner which will result in the hydration of the quicklime or calcium oxide formed during the calcination step of my process.

The main advantages of this hydration step are that it further increases the safety of the calcined calcium arsenate and it also improves the physical properties particularly when it is intended to be applied to the plants as dust by the so-called dusting method.

It will also be understood that my invention is not limited or restricted to the particular type of calcining furnace described in the specific example described above in connection with the calcination of ordinary commercial calcium arsenate to produce my improved product, but that any other suitable or convenient type of calcining furnace may be used such as a shelf type calcining furnace or Herreschoff type of furnace and the like.

I claim:

1. The method of treating calcium arsenate containing excess lime to reduce its injurious effect when applied to living plants, which comprises heating the said calcium arsenate while in a substantially dry granular state or condition to a temperature between about 1100 degrees Fahrenheit and 2200 degrees Fahrenheit until the said injurious effect on living plant organisms is substantially reduced.

2. An arsenate of calcium characterized by a degree of resistance toward the decomposing action of carbon dioxide solution or carbonic acid such that a representative sample of the said arsenate, weighing about 1.5 grams, when brought into intimate contact with about ¼ gram of carbon dioxide dissolved in about 750 c. c. of water at a temperature of about 65 degrees Fahrenheit for about 30 minutes with stirring reacts with the carbon dioxide and water to form an amount of soluble arsenic, expressed as metallic arsenic, not more than about 2 percent of the weight of the sample.

3. An arsenate of calcium characterized by a degree of resistance toward the decomposing action of carbon dioxide solution or carbonic acid such that a representative sample of the said arsenate, weighing about 1.5 grams, when brought into intimate contact with about ¼ gram of carbon dioxide dissolved in about 750 c. c. of water at a temperature of about 65 degrees Fahrenheit for about 30 minutes with stirring reacts with the carbon dioxide and water to form an amount of soluble arsenic, expressed as metallic arsenic, not more than 2 percent of the weight of the sample and said resistance toward the decomposing action of carbon dioxide solution being also such that a second representative sample of the arsenate of calcium, weighing about 1.5 grams, when brought into intimate contact with about 2 grams of carbon dioxide dissolved in about 750 c. c. of water at a temperature of about 65° F. for about 30 minutes with stirring reacts with the carbon dioxide and water to form an amount of soluble arsenic, expressed as metallic arsenic, not less than about ½% of the weight of the sample.

4. The method of treating calcium arsenate to reduce its injurious effect when applied to living plants which comprises heating the calcium arsenate while in a substantially dry state to a temperature of between about 1100° F. and about 2200° F. for a period of time not less than about ½ hour and not more than about 2 hours.

5. The method of treating calcium arsenate to reduce its injurious effect when applied to living plants which comprises heating the calcium arsenate while in a substantially dry state to a temperature above about 1100 degrees Fahrenheit until a representative sample of the product thus obtained, weighing about 1.5 grams, when brought into intimate contact with about ¼ gram of carbon dioxide dissolved in about 750 c. c. of water at a temperature of about 65 degrees Fahrenheit for about 30 minutes with stirring reacts with the carbon dioxide and water to form an amount of soluble arsenic expressed as metallic arsenic, not more than about 2 percent of the weight of the sample.

6. The method of treating calcium arsenate to reduce its injurious effect when applied to living plants which comprises heating the calcium arsenate while in a substantially dry state to a temperature above about 1100° F. until a representative sample of the product thus obtained, weighing about 1.5 grams, when brought into intimate contact with about ¼ gram of carbon dioxide dissolved in about 750 c. c. of water at a temperature of about 65° F. for about 30 minutes with stirring reacts with the carbon dioxide and water to form an amount of soluble arsenic expressed as metallic arsenic, not more than about 2 percent of the weight of the sample, and discontinuing the heating when a second representative sample of the resulting product weighing about 1.5 grams when brought into intimate contact with about 2 grams of carbon dioxide dissolved in about 750 c. c. of water at a temperature of about 65° F. for about 30 minutes with stirring reacts with the carbon dioxide and water to form an amount of soluble arsenic expressed as metallic arsenic, not less than about ½ percent of the weight of the sample.

7. The method of treating calcium arsenate and lime to reduce its injurious effect when applied to living plants which comprises heating the calcium arsenate and lime while in a substantially dry state to a temperature above about 1100 degrees Fahrenheit until the said injurious effect is substantially diminished, and then hydrating the product thus obtained.

8. The method of treating calcium arsenate and lime to reduce its injurious effect when applied to living plants which comprises heating the calcium arsenate and lime while in a substantially dry state to a temperature above about 1100 degrees Fahrenheit until a representative sample of the product thus obtained, weighing about 1.5 grams, when brought into intimate contact with about ¼ gram of carbon dioxide dissolved in about 750 c. c. of water at a temperature of about 65 degrees Fahrenheit for about 30 minutes with stirring reacts with the carbon dioxide and water to form an amount of soluble arsenic expressed as metallic arsenic, not more than about 2 percent of the weight of the sample, and then hydrating the product thus obtained.

9. The method of treating calcium arsenate to reduce its injurious effect when applied to living plants which comprises heating the calcium arsenate while in a substantially dry state to a temperature above about 1100° F. until a representative sample of the product thus obtained, weighing about 1.5 grams, when brought into intimate contact with about ¼ gram of carbon dioxide dissolved in about 750 c. c. of water at a temperature of about 65° F. for about 30 minutes with stirring reacts with the carbon dioxide and water to form an amount of soluble arsenic expressed as metallic arsenic, not more than about 2 percent of the weight of the sample, and discontinuing the heating when a second representative sample of the resulting product weighing about 1.5 grams when brought into intimate contact with about 2 grams of carbon dioxide dissolved in about 750 c. c. of water at a temperature of about 65° F. for about 30 minutes with stirring reacts with the carbon dioxide and water to form an amount of soluble arsenic expressed as metallic arsenic, not less than about ½ percent of the weight of the sample, and then hydrating the product thus obtained.

10. The method of treating an arsenate of a bi-valent non-toxic metal to reduce its injurious effect when applied to living plants to control insect pests thereon which comprises heating the said arsenate while in a substantially dry state to a temperature between about 1100° F. and 2200° F. until the said injurious effect on living plant organisms is substantially reduced, the said arsenate of a bi-valent non-toxic metal being selected from the group consisting of an arsenate of calcium and an arsenate of magnesium.

11. The method of treating calcium arsenate containing excess lime to reduce its injurious effect when applied to living plants which comprises heating the calcium arsenate while in a substantially dry state to a temperature above about 1100° F. until a representative sample of the product thus obtained, weighing about 1.5 grams, when brought into intimate contact with an amount of carbon dioxide substantially equivalent to the excess lime dissolved in about 750 c. c. of water at a temperature of about 65° F. for about 30 minutes with stirring reacts with the carbon dioxide and water to form an amount of soluble arsenic expressed as metallic arsenic, not more than about 2 percent of the weight of the sample, and discontinuing the heating when a second representative sample of the resulting product weighing about 1.5 grams when brought into intimate contact with about 2 grams of carbon dioxide dissolved in about 750 c. c. of water at a temperature of about 65° F. for about 30 minutes with stirring reacts with the carbon dioxide and water to form an amount of soluble arsenic expressed as metallic arsenic, not less than about ½ percent of the weight of the sample.

12. An arsenate of calcium containing uncombined or excess lime characterized by a degree of resistance toward the decomposing action of carbon dioxide solution or carbonic acid such that a representative sample of the said arsenate, weighing about 1.5 grams, when brought into intimate contact with an amount of carbon dioxide substantially equivalent to the excess lime dissolved in about 750 c. c. of water at a temperature of about 65° F. for about 30 minutes with stirring, reacts with the carbon dioxide and water to form an amount of soluble arsenic, expressed as metallic arsenic, not more than about 2 percent of the weight of the sample and said resistance toward the decomposing action of carbon dioxide solution being also such that a second representative sample of the arsenate of calcium, weighing about 1.5 grams when brought into intimate contact with about 2 grams of carbon dioxide dissolved in about 750 c. c. of water at a temperature of about 65° F. for about 30 minutes with stirring, reacts with the carbon dioxide and water to form an amount of soluble arsenic, expressed as metallic arsenic, not less than about ½% of the weight of the sample.

13. An arsenate of a bi-valent non-toxic metal characterized by a degree of resistance toward the decomposing action of carbon dioxide solution or carbonic acid such that a representative sample of the said arsenate weighing about 1.5 grams, when brought into intimate contact with about ¼ gram of carbon dioxide dissolved in about 750 c. c. of water at a temperature of about 65° F. for about 30 minutes with stirring, reacts with the carbon dioxide and water to form an amount of soluble arsenic, expressed as metallic arsenic, not more than about 2 percent of the weight of the sample, the said arsenate of a bi-valent non-toxic metal being selected from the group consisting of an arsenate of calcium and an arsenate of magnesium.

JOHN F. LES VEAUX.